United States Patent
Lai (10) Patent No.: US 9,482,254 B2
(45) Date of Patent: Nov. 1, 2016

(54) TELESCOPIC ROD

(71) Applicant: Hsin-Yuan Lai, Taichung (TW)

(72) Inventor: Hsin-Yuan Lai, Taichung (TW)

( * ) Notice: Subject to any disclaimer, the term of this patent is extended or adjusted under 35 U.S.C. 154(b) by 0 days.

(21) Appl. No.: 14/625,169

(22) Filed: Feb. 18, 2015

(65) Prior Publication Data

US 2016/0138635 A1    May 19, 2016

(30) Foreign Application Priority Data

Nov. 13, 2014    (TW) ............................. 103220141 U (51) Int. Cl.
    *F16B 7/00*       (2006.01)
    *F16B 7/14*       (2006.01)

(52) U.S. Cl.
    CPC .................... *F16B 7/1418* (2013.01)

(58) Field of Classification Search
    None
    See application file for complete search history.

(56) References Cited

U.S. PATENT DOCUMENTS

| | | | | |
|---|---|---|---|---|
| 2,526,470 A * | 10/1950 | Gauthier | ................ | F16B 2/065 403/46 |
| 3,069,190 A * | 12/1962 | Henson | .................... | B25G 3/00 15/145 |
| 3,832,072 A * | 8/1974 | Mazur | ....................... | F16B 7/06 403/46 |
| 4,596,484 A * | 6/1986 | Nakatani | ............... | F16B 7/1454 248/188.5 |
| 4,657,424 A * | 4/1987 | Dong | ....................... | B62D 7/20 403/46 |
| 5,558,349 A * | 9/1996 | Rubin | ...................... | B62H 5/00 280/287 |
| 6,142,699 A * | 11/2000 | Pao | ........................ | F16B 7/1454 403/109.5 |
| 6,182,939 B1 * | 2/2001 | Schoepper | ................. | B62J 1/06 248/599 |
| 8,075,217 B2 * | 12/2011 | Eason | .................... | F16B 7/0486 403/109.1 |
| 8,776,810 B2 * | 7/2014 | Lah | .......................... | A45B 9/00 135/65 |
| 9,062,794 B2 * | 6/2015 | Leger | ........................ | F16C 7/02 |
| 2005/0049720 A1 * | 3/2005 | Benson | ...................... | A61F 2/76 623/38 |
| 2005/0181329 A1 * | 8/2005 | Maitre | ................. | A61B 17/162 433/129 |
| 2008/0283703 A1 * | 11/2008 | Perlman | ................ | F16B 7/1418 248/230.3 |
| 2009/0272927 A1 * | 11/2009 | Dalluge | .................... | F16C 7/02 251/264 |
| 2012/0107037 A1 * | 5/2012 | Huang | .................... | F16B 7/105 403/109.3 |
| 2013/0111712 A1 * | 5/2013 | Lai | ........................ | F16B 7/1454 24/486 |
| 2013/0213174 A1 * | 8/2013 | Suzuki | ................... | B62D 1/187 74/493 |
| 2015/0210341 A1 * | 7/2015 | Chen | ...................... | B62K 19/36 297/215.13 |

* cited by examiner

*Primary Examiner* — Victor Macarthur
(74) *Attorney, Agent, or Firm* — Trop Pruner & Hu, P.C.

(57) ABSTRACT

A telescopic rod includes a large-diameter rod segment, a small-diameter rod segment, and a clamping unit. The large-diameter rod segment is telescopically joinable to the small-diameter rod segment, and includes a uniform-dimension main region, a marginal region, and a dimension reducible region which has left and right grip areas defined by an elongated gap and proximate and distal transverse slots communicated with the elongated gap. The clamping unit is displaceable between an untightened state and a tightened state, where the dimension reducible region is squeezed by the clamping unit such that the left and right grip areas tightly and evenly grip the small-diameter rod segment.

6 Claims, 8 Drawing Sheets

TELESCOPIC ROD

CROSS-REFERENCE TO RELATED APPLICATION

This application claims priority from Taiwanese application no. 103220141, filed on Nov. 13, 2014, the disclosure of which is incorporated in its entirety herein by reference.

FIELD OF THE INVENTION

This invention relates to a telescopic rod.

BACKGROUND OF THE INVENTION

A conventional telescopic rod includes a small-diameter rod segment, a large-diameter rod segment telescopically joinable to the small-diameter rod segment, and a locking unit surrounding the large-diameter rod segment. The locking unit is displaceable between an untightened state, where the small-diameter rod segment is slidable relative to the large-diameter rod segment, and a tightened state, where the large-diameter rod segment is forced by the locking unit into locking engagement with the small-diameter rod segment to thereby prevent movement of the small-diameter rod segment relative to the large-diameter rod segment.

Figure 1:
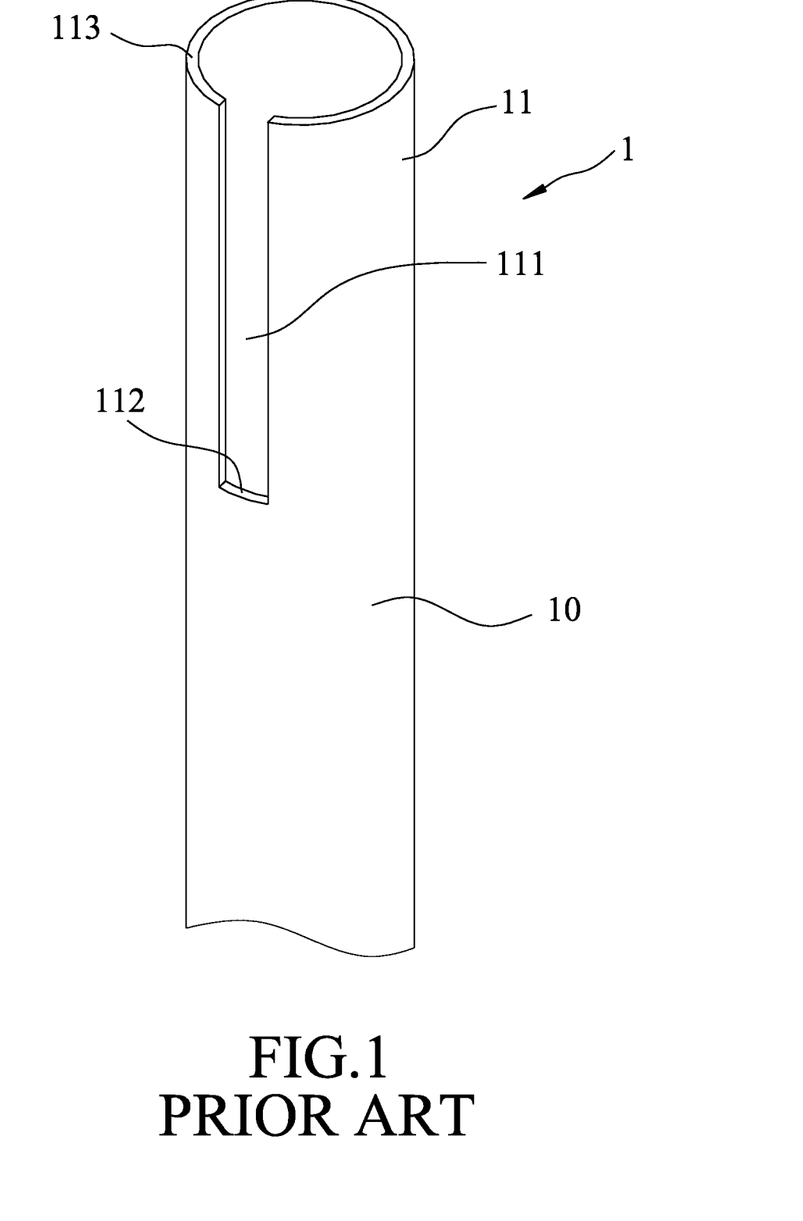
FIG. 1 is a fragmentary perspective view showing a large-diameter rod segment of a conventional telescopic rod.

The large-diameter rod segment 1 shown in FIG. 1 has a non-deformable region 10 and a deformable region 11. The deformable region 11 has a slot 111 extending from an open insertion end 113 of the large-diameter rod segment 1, through which the small-diameter rod segment (not shown) is inserted into the large-diameter rod segment 1, to terminate at a closed end 112 adjacent to the non-deformable region 10. When the locking unit is in the tightened state, the deformable region 11 is squeezed and deformed so that the diameter thereof is reduced.

Figure 2:
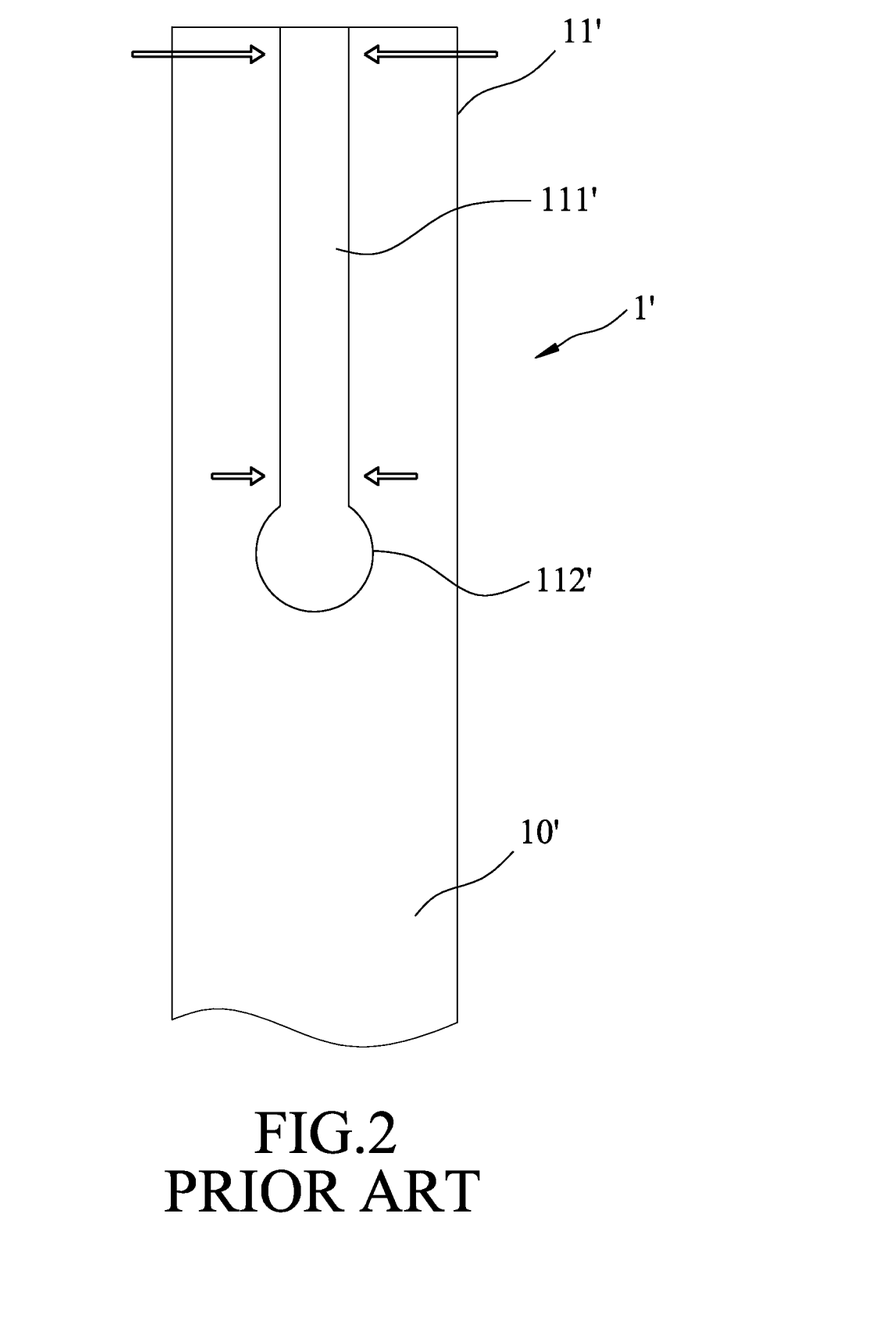
FIG. 2 is a fragmentary plan view showing a large-diameter rod segment of another conventional telescopic rod.

The large-diameter rod segment 1' shown in FIG. 2 is similar to that shown in FIG. 1, except that the slot 111' in FIG. 2 is widened at the closed end 112'.

However, both the large-diameter rod segments 1, 1' shown in FIGS. 1 and 2 suffer from the problem that, in the tightened state, deformation at the closed end 112 or 112' is limited by the non-deformable region 10 or 10', so that the reduction in diameter of the deformable region 11 or 11' is not uniform in the tightened state. Thus, the deformable region 11 or 11' of the large-diameter rod segment 1 or 1' may not be in full locking engagement with the small-diameter rod segment. As a result, the small-diameter rod segment may undesirably move relative to the large-diameter rod segment 11 or 11' in the tightened state.

SUMMARY OF THE INVENTION

Therefore, an object of the present invention is to provide a telescopic rod including a large-diameter rod segment, a small-diameter rod segment, and a clamping unit. When the clamping unit is in a tightened state, the small-diameter rod segment can be tightly and evenly gripped by the large-diameter rod segment, thereby preventing movement of the small-diameter rod segment relative to the large-diameter rod segment.

Accordingly, a telescopic rod of the present invention includes a large-diameter rod segment, a small-diameter rod segment, and a clamping unit. The large-diameter rod segment extends in a lengthwise direction, and is telescopically joinable to the small-diameter rod segment. The large-diameter rod segment includes a uniform-dimension main region, a marginal region, and a dimension reducible region which is disposed between the uniform-dimension main region and the marginal region, and which is formed with an elongated gap extending in the lengthwise direction to terminate at proximate and distal end zones relative to the marginal region. The dimension reducible region is further formed with proximate and distal transverse slots disposed opposite to each other in the lengthwise direction. Each of the proximate and distal transverse slots extends in a transverse direction relative to the lengthwise direction, and is in spatial communication with a corresponding one of the proximate and distal end zones of the elongated gap, thereby forming left and right grip areas that are spaced apart from each other by the elongated gap. The clamping unit includes a flexible collar which is disposed to surround the dimension reducible region such that when the small-diameter rod segment is joined to the large-diameter rod segment, the clamping unit is displaceable between an untightened state, where the small-diameter rod segment is telescopically slidable relative to the large-diameter rod segment, and a tightened state, where the dimension reducible region of the large-diameter rod segment is squeezed by the flexible collar such that the left and right grip areas tightly and evenly grip the small-diameter rod segment, thereby preventing movement of the small-diameter rod segment relative to the large-diameter rod segment.

BRIEF DESCRIPTION OF THE DRAWINGS

Other features and advantages of the present invention will become apparent in the following detailed description of the embodiments of the invention, with reference to the accompanying drawings, in which.

DETAILED DESCRIPTION OF THE EMBODIMENTS

Before the present invention is described in greater detail, it should be noted herein that same reference numerals are used to denote like elements throughout the specification.

Figure 3:
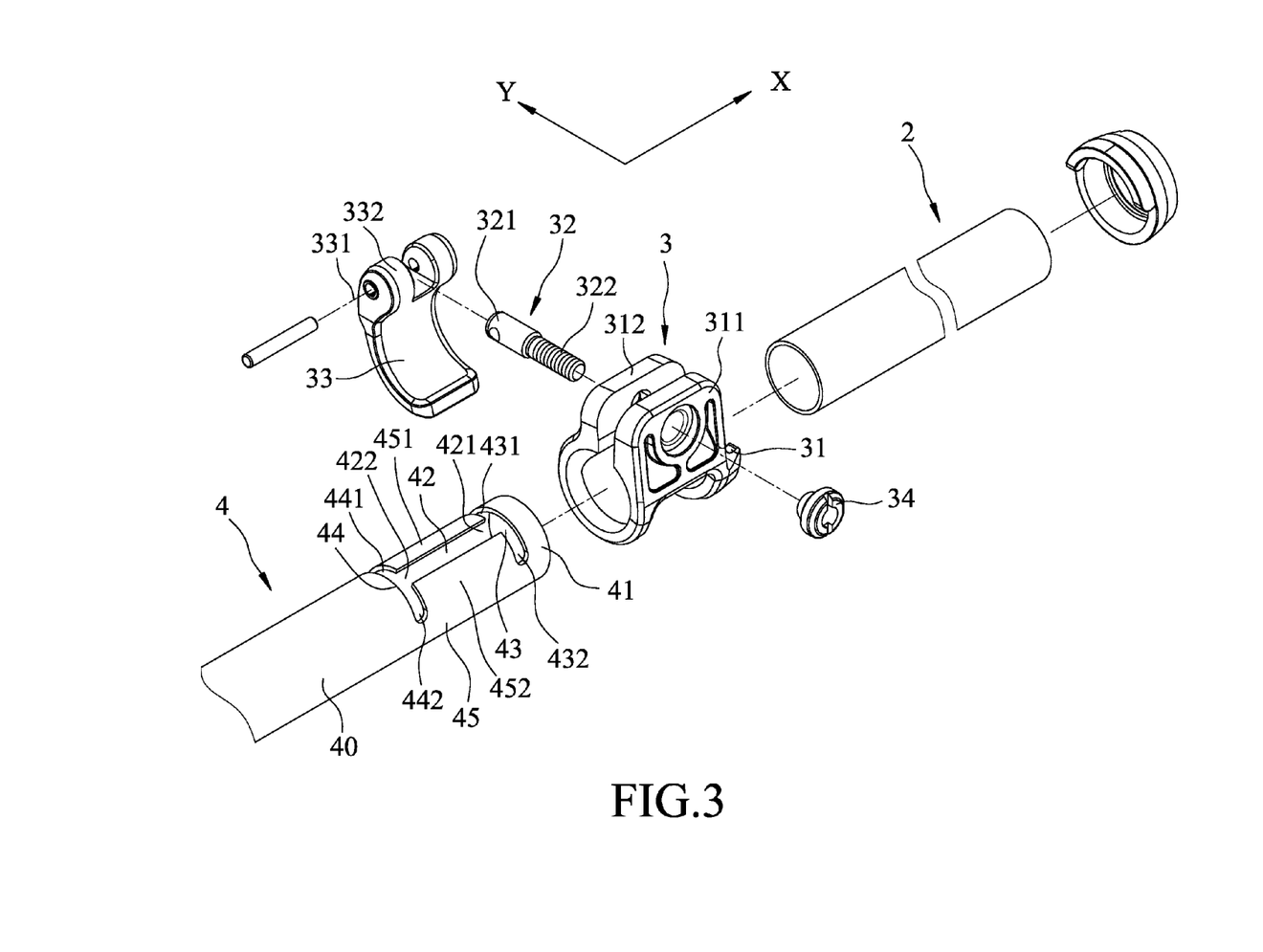
FIG. 3 is a fragmentary exploded perspective view of a telescopic rod according to a first embodiment of the present invention.
Figure 4:
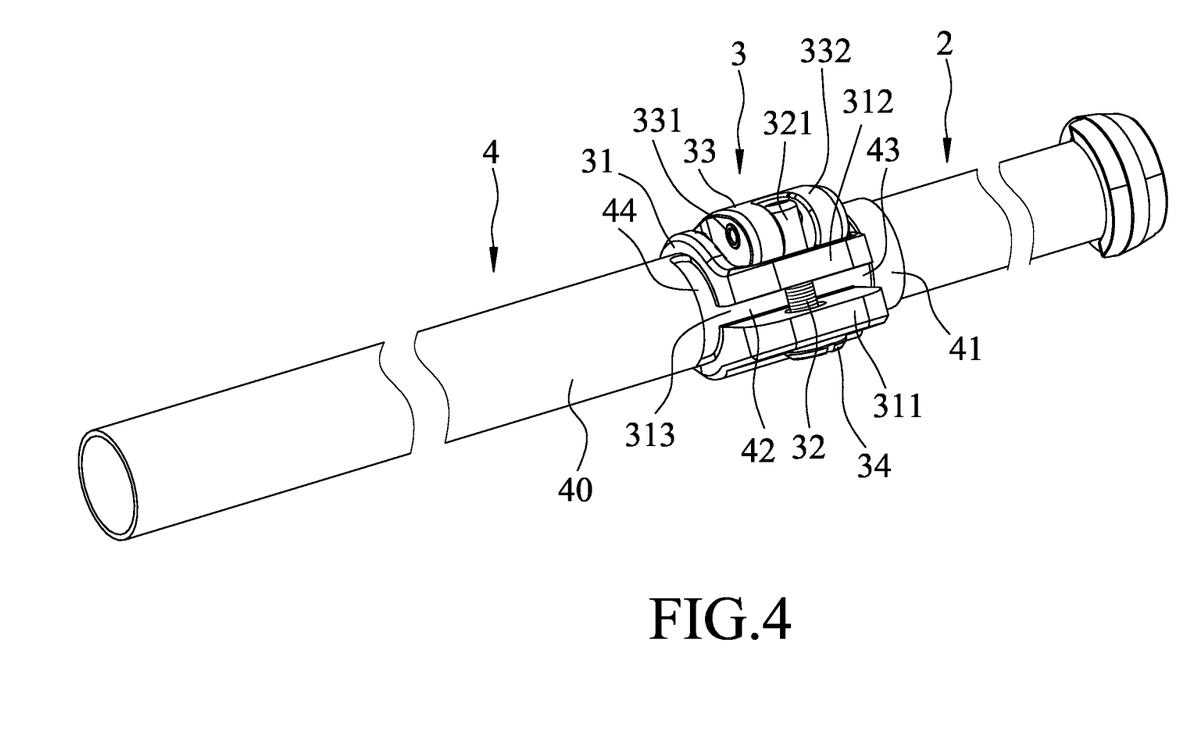
FIG. 4 is a fragmentary perspective view of the telescopic rod of FIG. 3 in an assembled state.
Figure 5:
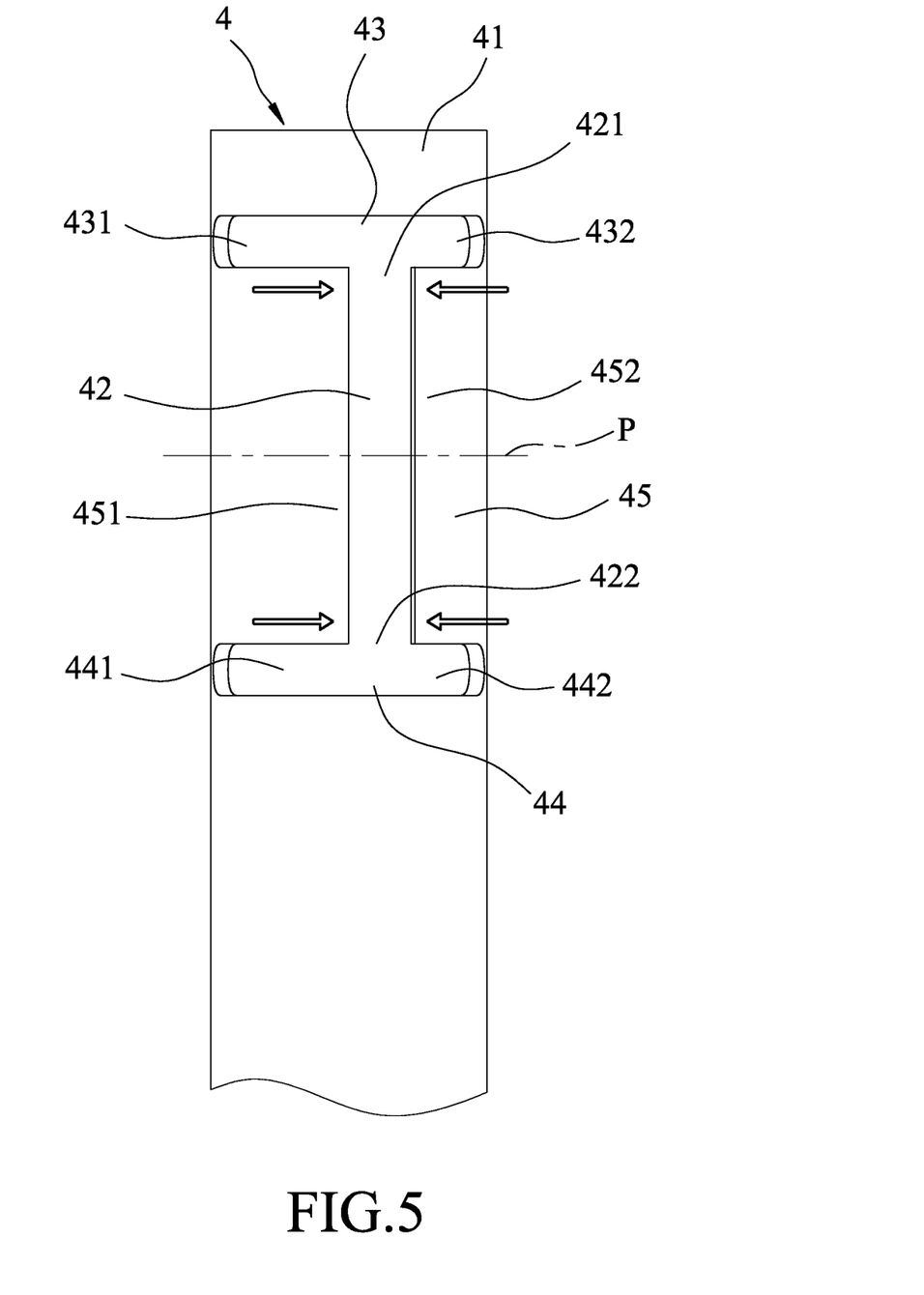
FIG. 5 is a fragmentary enlarged view of a large-diameter rod segment of the telescopic rod of FIG. 3.

With reference to FIGS. 3 to 5, a telescopic rod according to a first embodiment of the present invention is shown to include a small-diameter rod segment 2, a clamping unit 3, and a large-diameter rod segment 4.

The small-diameter rod segment 2 is insertable into the large-diameter rod segment 4. The large-diameter rod segment 4 extends in a lengthwise direction (X), and is telescopically joinable to the small-diameter rod segment 2. The large-diameter rod segment 4 includes a uniform-dimension main region 40, a marginal region 41, and a dimension reducible region 45 disposed between the uniform-dimension main region 40 and the marginal region 41.

The dimension reducible region 45 is formed with an elongated gap 42 extending in the lengthwise direction (X) to terminate at proximate and distal end zones 421, 422 relative to the marginal region 41. The dimension reducible region 45 is further formed with proximate and distal transverse slots 43, 44 disposed opposite to each other in the lengthwise direction (X). Each of the proximate and distal transverse slots 43, 44 extends in a transverse direction (Y) relative to the lengthwise direction (X), and is in spatial communication with a corresponding one of the proximate and distal end zones 421, 422 of the elongated gap 42, thereby forming left and right grip areas 451, 452 that are spaced apart from each other by the elongated gap 42.

In this embodiment, as best shown in FIG. 5, the proximate and distal transverse slots 43, 44 extend parallel to each other, and are symmetrical to each other relative to a center plane (P) that extends in the transverse direction (Y) to equally divide the elongated gap 42 into two. The proximate transverse slot 43 has left and right slot portions 431, 432 relative to the elongated gap 42. The right slot portion 432 is shorter than the left slot portion 431. The distal transverse slot 44 has a left slot portion 441 and a right slot portion 442 shorter than the left slot portion 441.

As best shown in FIG. 3, the clamping unit 3 includes a flexible collar 31 which is disposed to surround the dimension reducible region 45. When the small-diameter rod segment 2 is jointed to the large-diameter rod segment 4, the clamping unit 3 is displaceable between an untightened state, where the small-diameter rod segment 2 is telescopically slidable relative to the large-diameter rod segment 4, and a tightened state (FIG. 4), where the dimension reducible region 45 of the large-diameter rod segment 4 is squeezed by the flexible collar 31 such that the left and right grip areas 451, 452 tightly and evenly grip the small-diameter rod segment 2, thereby preventing movement of the small-diameter rod segment 2 relative to the large-diameter rod segment 4.

The flexible collar 31 extends about the dimension reducible region 45 to terminate at first and second lug portions 311, 312 which define a collar gap 313 therebetween. The clamping unit 3 further includes a bolt member 32, a lever arm 33 and a screw nut 34.

The bolt member 32 extends through the first and second lug portions 311, 312, and has a head end 321 disposed to abut the second lug portion 312, and a threaded tail end 322 engageable with the screw nut 34 such that the screw nut 34 abuts against the first lug portion 311. The lever arm 33 is pivotally connected to the head end 321 of the bolt member 32 about a hinge axis 331, and has a camming surface 332 configured such that when the lever arm 33 is turned about the hinge axis 331 to displace the clamping unit 3 from the untightened state (not shown) to the tightened state (FIG. 4), the camming surface 332 is angularly displaced to permit the first and second lug portions 311, 312 to move toward each other by virtue of camming action between the camming surface 332 and the second lug portion 312.

In this embodiment, because the proximate and distal transverse slots 43, 44 are symmetrical to each other relative to the center plane (P), the reduction in dimension of the dimension reducible region 45 close to the proximate transverse slot 43 is substantially the same as that close to the distal transverse slot 44. Thus, the left and right grip areas 451, 452 of the large-diameter rod segment 4 can evenly and tightly grip the small-diameter rod segment 2.

Figure 6:
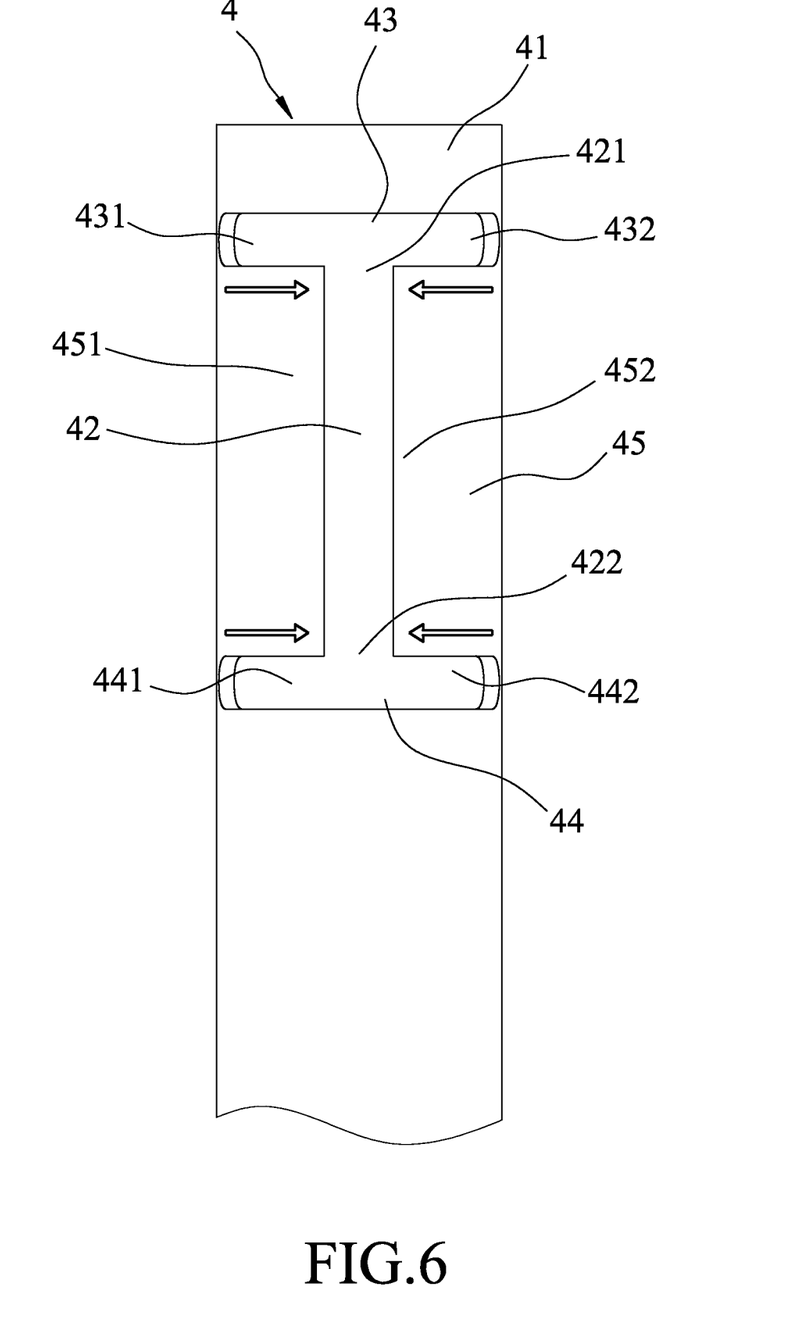
FIG. 6 is a fragmentary enlarged view of a large-diameter rod segment of a telescopic rod according to a second embodiment of the present invention.

FIG. 6 shows a portion of a large-diameter rod segment 4 of a telescopic rod according to a second embodiment of the present invention. The second embodiment is similar to the first embodiment, except that, in the second embodiment, the left and right slot portion 431, 432 of the proximate transverse slot 43 are substantially the same in length, and that the left and right slot portions 441, 442 of the distal transverse slot 44 are substantially the same in length.

Figure 7:
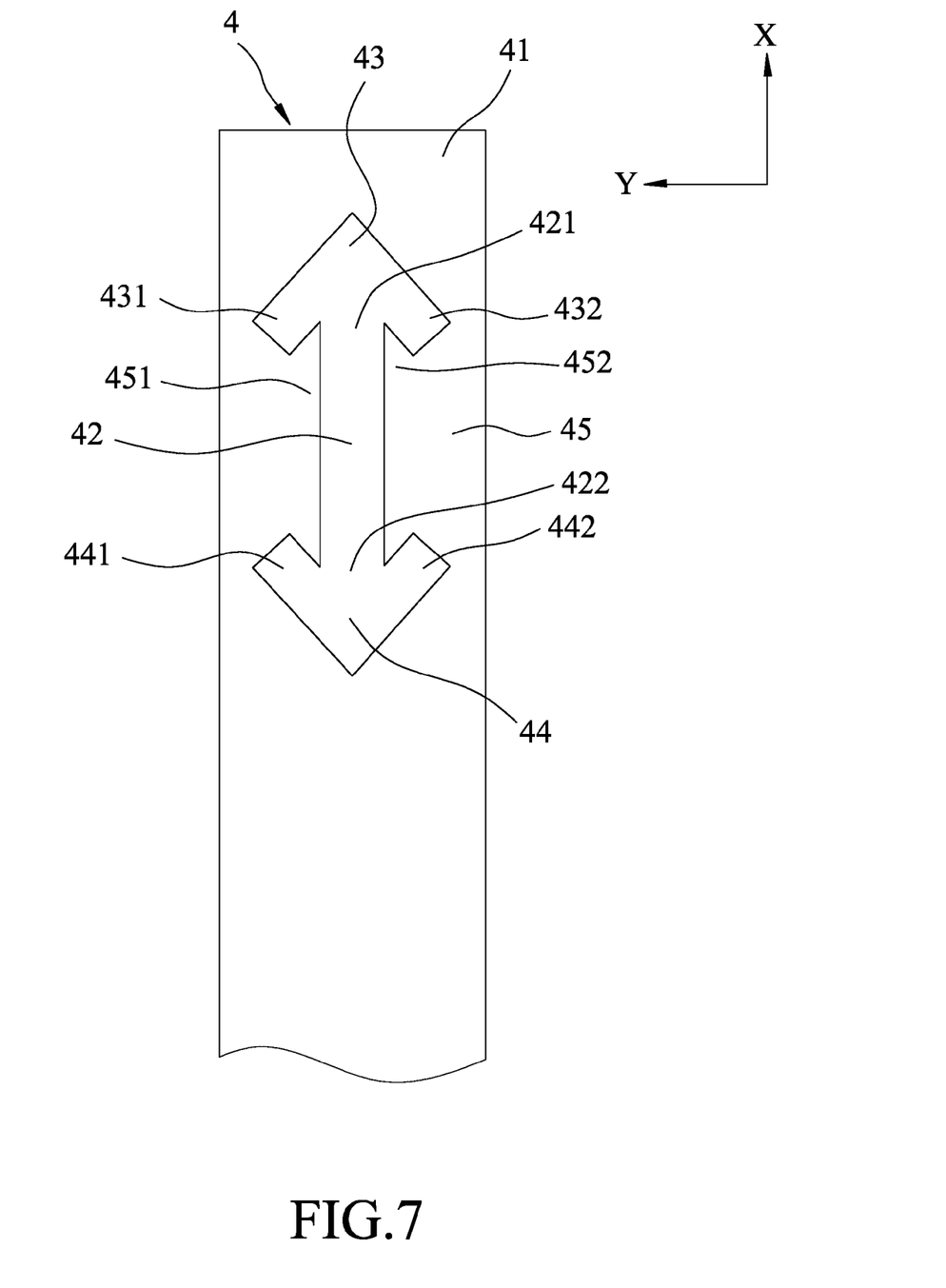
FIG. 7 is a fragmentary enlarged view of a large-diameter rod segment of a telescopic rod according to a third embodiment of the present invention.

FIG. 7 shows a portion of a large-diameter rod segment 4 of a telescopic rod according to a third embodiment of the present invention. The third embodiment is similar to the second embodiment, except that, in the third embodiment, the left and right slot portion 431, 432 of the proximate transverse slot 43 extend from the proximate end zone 421 of the elongated gap 42 toward the lengthwise direction (X) and extend away from each other, and that the left and right slot portions 441, 442 of the distal transverse slot 44 extend from the distal end zone 422 toward the lengthwise direction (X) and extend away from each other. Furthermore, the left slot portions 431, 441 of the proximate and distal transverse slots 43, 44 extend toward each other, and the right slot portions 432, 442 of the proximate and distal transverse slots 43, 44 extend toward each other.

Figure 8:
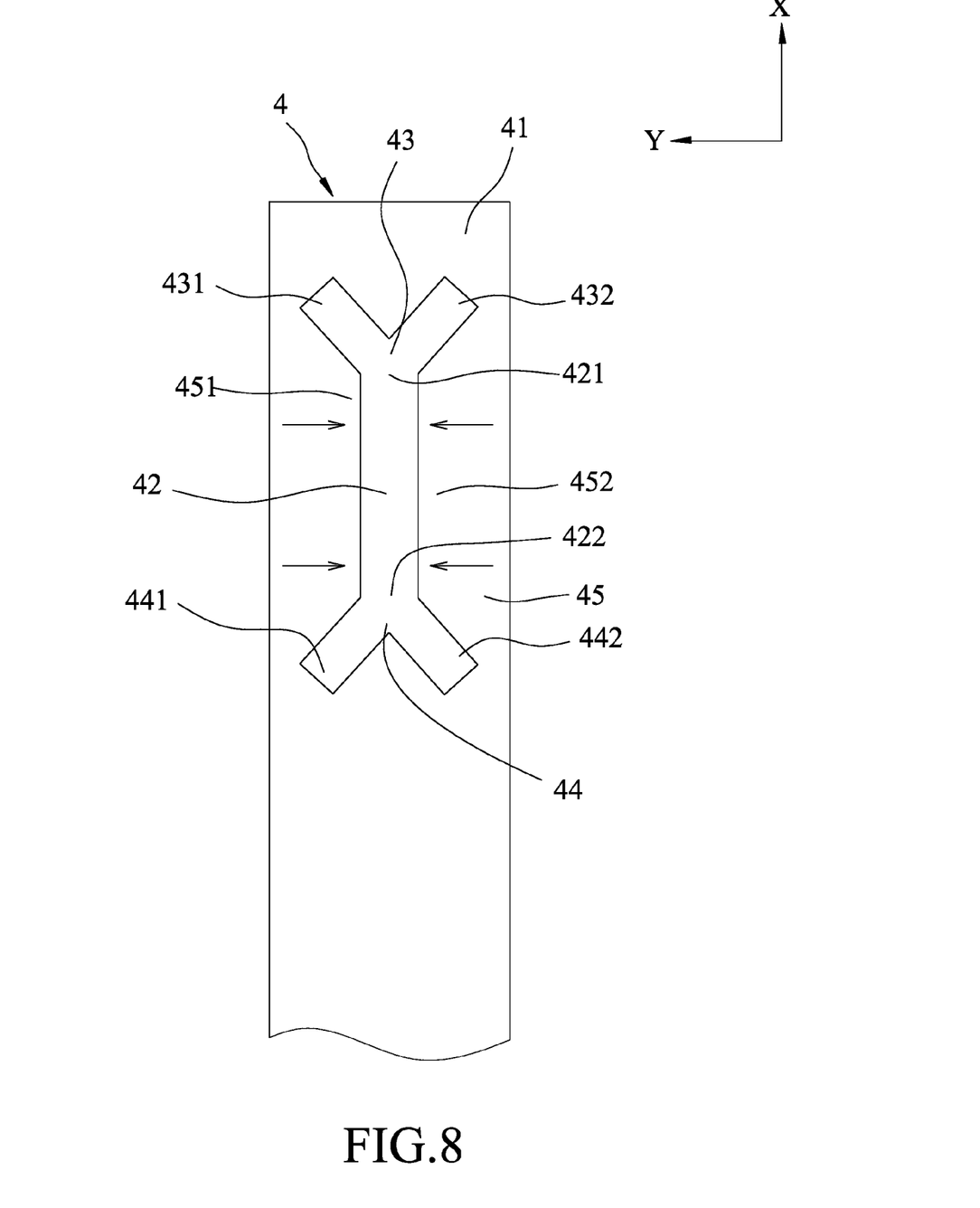
FIG. 8 is a fragmentary enlarged view of a large-diameter rod segment of a telescopic rod according to a fourth embodiment of the present invention.

FIG. 8 shows a portion of a large-diameter rod segment 4 of a telescopic rod according to a fourth embodiment of the present invention. The fourth embodiment is similar to the third embodiment, except that, in the fourth embodiment, the left slot portions 431, 441 of the proximate and distal transverse slots 43, 44 extend away from each other, and the right slot portions 432, 442 of the proximate and distal transverse slots 43, 44 extend away from each other.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A telescopic rod comprising:
   a small-diameter rod segment;
   a large-diameter rod segment which extends in a lengthwise direction, and which is telescopically joinable to said small-diameter rod segment, said large-diameter rod segment including a uniform-dimension main region, a marginal region, and a dimension reducible region which is disposed between said uniform-dimension main region and said marginal region, and which is formed with an elongated gap extending in the lengthwise direction to terminate at proximate and distal end zones relative to said marginal region, said dimension reducible region being further formed with proximate and distal transverse slots disposed opposite to each other in the lengthwise direction, each of said proximate and distal transverse slots extending in a transverse direction relative to the lengthwise direction, and being in spatial communication with a corresponding one of said proximate and distal end zones of said elongated gap, thereby forming left and right grip areas that are spaced apart from each other by said elongated gap; and
   a clamping unit including a flexible collar which is disposed to surround said dimension reducible region such that when said small-diameter rod segment is joined to said large-diameter rod segment, said clamping unit is displaceable between an untightened state, where said small-diameter rod segment is telescopically slidable relative to said large-diameter rod segment, and a tightened state, where said dimension reducible region of said large-diameter rod segment is squeezed by said flexible collar such that said left and right grip areas tightly and evenly grip said small-diameter rod segment, thereby preventing movement of said small-diameter rod segment relative to said large-diameter rod segment, wherein each of said proximate and distal transverse slots has left and right slot portions which extend away from each other from the corresponding one of said proximate and distal end zones of said elongated gap.

2. The telescopic rod according to claim 1, wherein said proximate and distal transverse slots extend parallel to each other.

3. The telescopic rod according to claim 1, wherein said proximate and distal transverse slots are symmetrical to each other relative to a center plane that extends in the transverse direction to equally divide said elongated gap into two.

4. The telescopic rod according to claim 1, wherein said left slot portions of said proximate and distal transverse slots extend toward each other, and said right slot portions of said proximate and distal transverse slots extend toward each other.

5. The telescopic rod according to claim 1, wherein said left slot portions of said proximate and distal transverse slots extend away from each other, and said right slot portions of said proximate and distal transverse slots extend away from each other.

6. The telescopic rod according to claim 1, wherein said flexible collar extends about said dimension reducible region to terminate at first and second lug portions which define a collar gap therebetween, said clamping unit further including a screw nut, a bolt member extending through said first and second lug portions, and having a head end disposed to abut said second lug portion, and a threaded tail end engageable with said screw nut such that said screw nut abuts against said first lug portion, and a lever arm pivotally connected to said head end of said bolt member about a hinge axis, and having a camming surface configured such that when said lever arm is turned about the hinge axis to displace said clamping unit from the untightened state to the tightened state, said camming surface is angularly displaced to permit said first and second lug portions to move toward each other by virtue of camming action between said camming surface and said second lug portion.

* * * * *